US012209435B2

(12) United States Patent
Bedford et al.

(10) Patent No.: US 12,209,435 B2
(45) Date of Patent: Jan. 28, 2025

(54) PUSH THROUGH LATCH

(71) Applicant: Sargent Manufacturing Company, New Haven, CT (US)

(72) Inventors: Michael Bedford, East Hampton, CT (US); Brian R. Fournier, Canton, CT (US); Scott Kasper, Killingworth, CT (US); William Middelaer, Simsbury, CT (US); David Nguyen, Farmington, CT (US); Ray Nolan, Southington, CT (US); Christine Voelker, East Hampton, CT (US); Todd C. Zimmer, Cromwell, CT (US)

(73) Assignee: Sargent Manufacturing Company, New Haven, CT (US)

( * ) Notice: Subject to any disclaimer, the term of this patent is extended or adjusted under 35 U.S.C. 154(b) by 653 days.

(21) Appl. No.: 17/198,577

(22) Filed: Mar. 11, 2021

(65) Prior Publication Data

US 2021/0293053 A1 Sep. 23, 2021

Related U.S. Application Data

(60) Provisional application No. 62/990,782, filed on Mar. 17, 2020.

(51) Int. Cl.
*E05B 55/12* (2006.01)
*E05B 17/20* (2006.01)
(Continued)

(52) U.S. Cl.
CPC .......... *E05B 63/20* (2013.01); *E05B 17/2007* (2013.01); *E05B 47/0012* (2013.01);
(Continued)

(58) Field of Classification Search
CPC ........ E05B 55/00; E05B 55/005; E05B 55/12; E05B 17/20; E05B 17/2007;
(Continued)

(56) References Cited

U.S. PATENT DOCUMENTS 1,758,203 A 5/1930 Samuel
2,113,747 A 4/1938 Roedding et al.
(Continued)

FOREIGN PATENT DOCUMENTS

EP 2975202 A1 * 1/2016 ............. E05B 55/00
GB 1529228 A * 10/1978 ......... E05B 47/0607
(Continued)

OTHER PUBLICATIONS

U.S. Appl. No. 16/543,915, filed Aug. 19, 2019, Wong.

*Primary Examiner* — Alyson M Merlino
(74) *Attorney, Agent, or Firm* — Wolf, Greenfield & Sacks, P.C.

(57) ABSTRACT

A door lock may include a latch bolt head and a blocking pin. The latch bolt head may be configured to move between an extended position and a retracted position to selectively engage a latch head pocket of a door jamb. The latch bolt head may also be configured to move between a first rotational position and a second rotational position, wherein the blocking pin is configured to prevent movement of the latch bolt head from the first rotational position to the second rotational position when the blocking pin is in an engaged position.

19 Claims, 8 Drawing Sheets

(51) Int. Cl.
*E05B 47/00* (2006.01)
*E05B 63/20* (2006.01)
*E05C 5/00* (2006.01)
*E05B 15/10* (2006.01)

(52) U.S. Cl.
CPC ................ *E05B 55/12* (2013.01); *E05C 5/00* (2013.01); *E05B 2015/105* (2013.01); *E05B 2047/0017* (2013.01); *E05B 2047/0024* (2013.01)

(58) Field of Classification Search
CPC ............... E05B 17/203; E05B 17/2038; E05B 17/2049; E05B 17/2057; E05B 15/10; E05B 15/102; E05B 47/0603; E05B 57/00; E05C 5/00; E05C 5/02; Y10T 292/0863; Y10T 292/0864; Y10T 292/0867; Y10T 292/0868; Y10T 292/1037; Y10T 292/0886; Y10T 292/0969; Y10T 292/0977; Y10T 292/098
See application file for complete search history.

(56) References Cited

U.S. PATENT DOCUMENTS

| | | | | | |
|---|---|---|---|---|---|
| 2,156,004 | A * | 4/1939 | Vanderlinde ............ | E05B 85/24 292/DIG. 31 |
| 2,346,656 | A * | 4/1944 | Berghoff ................. | E05B 85/22 292/192 |
| 2,575,465 | A | 11/1951 | Patton | |
| 3,359,027 | A * | 12/1967 | Schlage .................. | E05B 59/00 292/222 |
| 3,371,947 | A * | 3/1968 | Gridley ................. | E05B 63/127 292/108 |
| 4,087,121 | A | 5/1978 | Davis | |
| 4,181,338 | A | 1/1980 | Sterling | |
| 4,573,333 | A * | 3/1986 | Choi ................... | E05B 47/0607 292/201 |
| 4,671,549 | A * | 6/1987 | Marotto .................. | E05B 63/20 292/1.5 |
| 5,113,676 | A * | 5/1992 | Panossian ............... | E05B 55/12 70/462 |
| 5,474,342 | A | 12/1995 | Smith et al. | |
| 5,794,991 | A | 8/1998 | Smallegan et al. | |
| 6,536,812 | B1 | 3/2003 | Winardi | |
| 7,410,196 | B2 | 8/2008 | Stein | |
| 7,980,603 | B2 * | 7/2011 | Peabody ................. | E05B 55/12 292/216 |
| 9,187,938 | B2 | 11/2015 | Pluta | |
| 9,945,153 | B2 | 4/2018 | Scheffler et al. | |
| 11,598,131 | B2 * | 3/2023 | Romero .................. | E05B 55/12 |
| 2007/0007773 | A1 | 1/2007 | Berkseth et al. | |
| 2008/0127686 | A1 | 6/2008 | Hwang | |
| 2010/0109349 | A1 | 5/2010 | Peabody et al. | |
| 2015/0075233 | A1 | 3/2015 | Pluta | |
| 2015/0330100 | A1 * | 11/2015 | Helisten ................ | E05B 15/102 292/157 |
| 2017/0268256 | A1 | 9/2017 | Geringer et al. | |
| 2019/0376317 | A1 | 12/2019 | Hsu | |
| 2019/0383060 | A1 | 12/2019 | Lien | |
| 2020/0056403 | A1 | 2/2020 | Wong | |

FOREIGN PATENT DOCUMENTS

| | | | |
|---|---|---|---|
| KR | 20170111228 | A * | 10/2017 |
| KR | 20170119114 | A * | 10/2017 |
| KR | 102282164 | B1 * | 7/2021 |

* cited by examiner

PUSH THROUGH LATCH

RELATED APPLICATIONS

This application claims the benefit under 35 U.S.C. § 119(e) of U.S. Provisional Application No. 62/990,782, filed Mar. 17, 2020, which is hereby incorporated by reference in its entirety.

FIELD

Disclosed embodiments are related to door locks, and in particular push through latches and related methods of use.

BACKGROUND

Bored locks are commonly employed on doors to secure the doors. Conventional bored locks employ a linearly translating latch bolt which typically includes a strike face that allows a door to be closed without retracting the latch and a locking face that prevents the door from being opened without first retracting the latch. In some cases, electronic bored locks have been employed which electromechanically retract the latch.

SUMMARY

In some embodiments, a door lock includes a latch bolt head having a strike face and a locking face. The latch bolt head is moveable along a first axis between an extended position and a retracted position, and the latch bolt head is movable between a first rotational position and a second rotational position. In the first rotational position, the locking face is parallel to the first axis, and in the second rotational position the locking face is angled relative to the first axis. The door lock also includes a blocking pin configured to move between an engaged position and a disengaged position, where in the engaged position the blocking pin prevents the latch bolt from moving from the first rotational position to the second rotational position.

In some embodiments, a door lock includes a latch bolt head having a strike face and a locking face, where the latch bolt head is moveable along a first axis between an extended position and a retracted position. The latch bolt head is also movable between a first rotational position and a second rotational position. In the first rotational position, the locking face is configured to engage a latch head pocket to prevent the opening of an associated door, and in the second rotational position the locking face is configured to strike a latch head pocket and move the latch bolt head from the extended position to the retracted position. The door lock also includes a blocking pin configured to move between an engaged position and a disengaged position, where in the engaged position the blocking pin prevents the latch bolt from moving from the first rotational position to the second rotational position.

In some embodiments, a method of locking and unlocking a door includes striking a latch head pocket of a door jamb with a strike face of a latch bolt head to move the latch bolt head from an extended position to a retracted position, moving the latch bolt head from the retracted position to an extended position where the latch bolt head is at least partially disposed in the latch head pocket, unblocking the latch bolt head from moving from a first rotational position to a second rotational position, rotating the latch bolt head from the first rotational position to the second rotational position, and striking the latch head pocket of the door jamb with a locking face of the latch bolt head to move the latch bolt head from the extended position to the retracted position.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
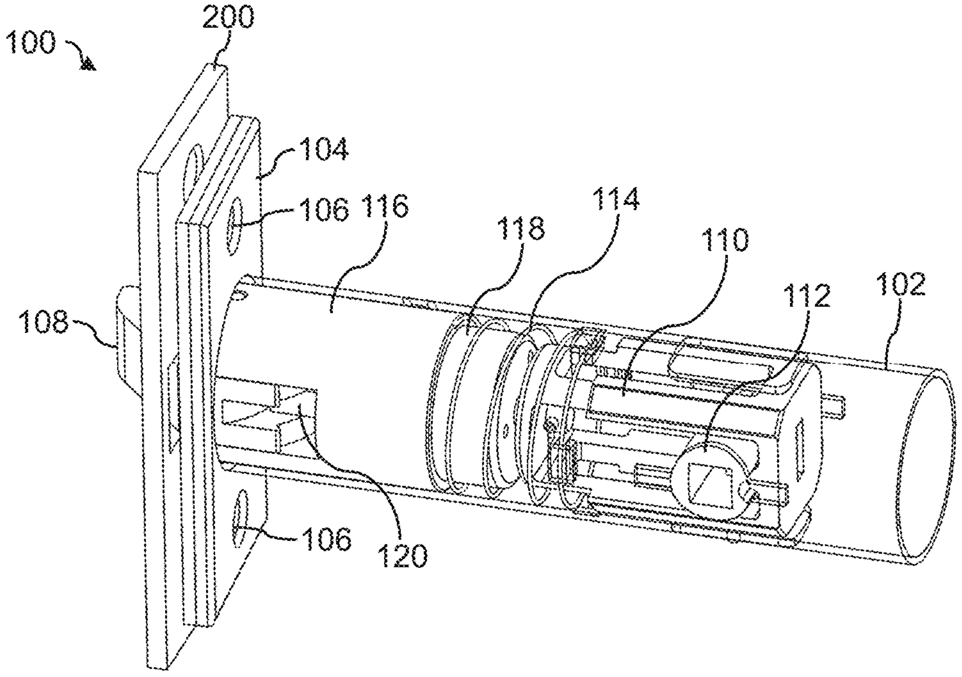
FIG. 1 is a perspective view of one embodiment of a push through latch.

Conventional bored locks employ a linearly translating latch bolt which typically includes an inclined face that allows a door to be closed without retracting the latch and a locking face that prevents the door from being opened without first retracting the latch. In some cases, electronic bored locks have been employed which electromechanically retract the latch. However, electromechanical retraction may be energy intensive, oftentimes requires significant power to overcome the biasing forces of springs commonly found in board locks. Additionally, as bored locks often occupy a small volume inside of a door (in contrast to mortise locks), there is oftentimes little volume for energy storage (e.g., batteries, capacitors), conventional solutions for electromechanically actuated bored locks may be limited in off-grid applications. That is, conventional electromechanical actuators for bored locks may have limited battery life due to power draw required for retracting conventional latch bolt heads.

In view of the above, the inventors have recognized the benefits of a push through latch that employs a rotatable latch bolt head. The rotation of the rotatable latch bolt head may be controlled by a blocking pin or other blocker that may be moved with low energy input from an electromechanical actuator or manual actuator. By allowing the latch head to rotate, a strike face and a locking face may swap angles, such that the locking face retracts the bolt when a closed door is pushed open. Accordingly, such an arrangement may reduce the energy draw for retracting a latch by an electromechanical actuator or manually by a user.

In some embodiments, a push through latch includes a latch bolt head and a blocker (e.g., a blocking pin). The latch bolt head is configured to move substantially linearly along a first axis between an extended position and a retracted position. In some embodiments, the latch bolt head may be rotatably coupled to a latch bolt head housing with a pin, such that the latch bolt head and latch bolt head housing move together between the extended position and the retracted position. The latch bolt head may be rotatable about the pin between a first rotational and a second rotational position relative to the latch bolt head housing. The rotation of the latch bolt head may be controlled by the blocker, which may move between an engaged position and a disengaged position. In the engaged position, the blocker may engage the latch bolt head to inhibit the latch bolt head from moving to the second rotational position. In the disengaged position, the blocker may disengage the latch bolt head to allow the latch bolt head to rotate about the pin to the second rotational position. The latch bolt head may include a strike face and a locking face. In the first rotational position, the strike face may be inclined relative to the first axis while the locking face is substantially parallel to the first axis. In this arrangement, the strike face may be configured to contact a latch head pocket of a door jamb to move the latch bolt head from the extended position to the retracted position. The locking face is configured to engage the latch head pocket of the door jamb to prevent an opening of a door when the latch bolt head is in an extended position inside of the latch head pocket. However, when the latch bolt head is passively rotated to the second rotational position, the locking face and strike face swap angles. That is, the locking face may be passively rotated so that is inclined relative to the first axis, in a direction opposite the previous incline of the strike face. Accordingly, when the locking face engages the latch head pocket, the locking face may move the latch bolt head from the extended position to the retracted position. In this manner, the push through latch may allow a door lock to be opened without manually or electromechanically retracting the latch bolt head, as once the push through latch is allowed to rotate to the second rotational position, the associated door may be pushed or pulled open.

In some embodiments, a push through latch according to exemplary embodiments described herein may be actuated using one or more actuators. In some embodiments, an actuator may include a mechanical actuator such as a push button or switch. The button or switch may be disposed on an interior door handle or interior escutcheon (i.e., on the secure side of a door). Accordingly, a user may operate the button or switch on the interior door handle or escutcheon and simply push the door to retract the latch and open the door. That is, a user may not have to turn a handle, as would be the case on a conventional bored lock. In some embodiments, the actuator may include an electromechanical actuator such as a solenoid, servo, or linear actuator. The electromechanical actuator may be configured to selectively actuate the blocking pin or other blocker to allow a door to be opened with a simple push without having to turn a handle. Accordingly, the electromechanical actuator may not retract the latch, thereby reducing the energy consumption of the electromechanical actuator to open a door, and instead simply move the blocker out of the way to allow the latch to rotate or move. In some embodiments, the electromechanical actuator may receive commands from a processor and/or a remote device, as will be discussed further below.

In some embodiments, door locks including push through latches of exemplary embodiments described herein may be controlled locally and/or remotely with one or more complementary devices. In some embodiments, a door lock may include a processor configured to execute computer readable instructions stored in memory. The processor may be electrically connected to an electromechanical actuator and configured to control the operation of the electromechanical actuator. The processor may also be configured to communicate with one or more complementary devices via one or more networks. For example, the processor may be electrically connected to a wireless transceiver that may send and receive wireless signals via one or more wireless protocols (e.g., Bluetooth, Wi-Fi, 802.15.4, Z-Wave, Bluetooth Low-Energy, NFC, RFID, GSM, CDMA). Accordingly, one or more complementary devices communicating over one or more wireless protocols or through the internet may command the processor to operate an electromechanical actuator. The one or more complementary device may include, but are not limited to, smartphones, personal computers, tablets, and servers.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a perspective view of one embodiment of a push through latch 100 of a door lock. As shown in FIG. 1, the push through latch includes a latch housing 102 (shown transparently for clarity) and a door plate 104 having two fastening holes 106. The door plate and fastening holes may be used to rigidly secure the latch housing 102 in a door (e.g., with fasteners such as screws). As shown in FIG. 1, the push through latch 100 also includes a latch bolt head 108 projecting from the door plate 104. According to the embodiment of FIG. 1, the latch bolt head 108 is configured to both move between an extended and retracted position as well as a first rotational position and a second rotational position, as will be discussed further with reference to FIGS. 2-8. In the embodiment of FIG. 1, the push through latch also includes an actuator 110. The actuator is coupled to the latch bolt head 108 and is configured to move the latch bolt head between the extended position and retracted position within the latch housing 102. In one embodiment, the actuator 110 includes a [The] handle coupler 112; the handle coupler is configured to receive a handle 402 (see FIGS. 14-15) of a door lock, where rotating the handle moves the actuator 110 by a camming action. In that embodiment the acutator 110 is a handle actuator. In another embodiement, the electromechanical actuator is the actuator 110. In some embodiments and additional actuator is configured to move the latch bolt head is an electomechanical actuator **110*a***, the electromechanical actuator is controlled by a processor 110*b*, (shown only in FIG. 3 for clarity). In other embodiments, the clecrtomechanical actuator 110*a* is a solenoid. According to the embodiment of FIGS. 1 and 2, the latch bolt head 108 is coupled to a latch bolt head housing 116. In particular, the latch bolt head 108 is rotatably coupled to the latch bolt head housing with a pin 124 so that the latch bolt head is able to rotate relative to the latch bolt head housing, but the latch bolt head housing and latch bolt head move together between the extended and retracted position. As shown in FIG. 1, the latch bolt head housing includes a spring receiving portion 118 configured to receive a compression spring 114. The compression spring 114 couples the actuator 110 to the latch bolt head housing 116, allowing the actuator 110 to move the latch bolt head housing 116 between the extended and retracted positions. The compression spring 114 also functions to bias the latch bolt head 108 toward the extended position. Of course, while a compression spring 114 is employed in the embodiment of FIG. 1, any suitable biasing member may be employed to couple the actuator 110 to the latch bolt head 108, as the present disclosure is not so limited. As shown in FIG. 1, the push through latch 100 also includes a latch bolt head biasing plunger 120 which biases the latch bolt head 108 toward the first rotational position.

According to the state shown in FIG. 1, the latch bolt head 108 is in the extended position and first rotational position. Accordingly, the latch bolt head 108 is projecting through a strike plate 200 of an associated latch head pocket. Accordingly, the push through latch may secure a door when in the state of FIG. 1.

Figure 2:
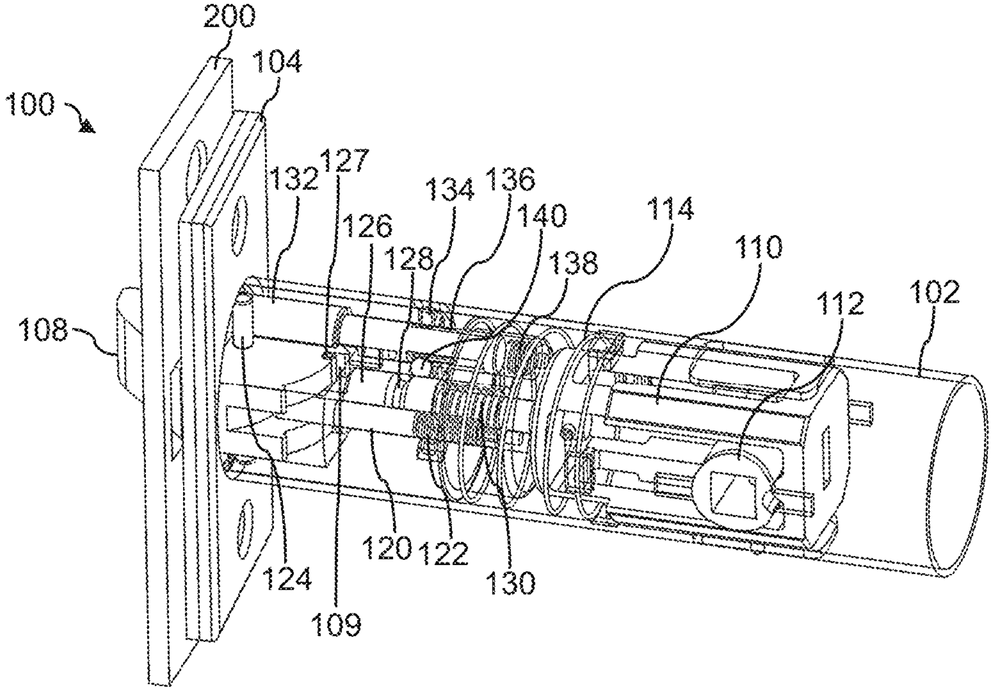
FIG. 2 is a perspective view of the push through latch of FIG. 1 shown with a transparent latch bolt head housing.

FIG. 2 is a perspective view of the push through latch 100 of FIG. 1 with a latch bolt head housing shown in transparent for clarity to reveal the internal components of the push through latch. As noted with reference to FIG. 1, the push through latch includes a latch bolt head 108 which is movable between an extended and retracted position by an actuator 110. The latch bolt head 108 is coupled to the actuator 110 via a compression spring 114. As discussed previously, the latch bolt head 108 is rotatably coupled to the latch bolt head housing with a pin 124. Accordingly, the latch bolt head 108 moves linearly inside of the latch housing 102 between the extended position and retracted position with the latch bolt head housing. As shown in FIG. 2, the latch bolt head biasing plunger 120 urges the latch bolt head 108 to the first rotational position shown in FIGS. 1-2 via compression spring 122 disposed between the latch bolt head biasing plunger and the latch bolt head housing.

According to one embodiment as best shown in FIG. 2, the push through latch 100 includes a blocking pin 126 configured to selectively inhibit or allow rotation of the latch bolt head 108 between the first rotational position and a second rotational position. That is, the blocking pin 126 is configured to move between an engaged position where the blocking pin inhibits rotation of the latch bolt head and a disengaged position where the blocking pin allows rotation of the latch bolt head. The blocking pin of FIG. 2 moves in a direction parallel to a direction of movement of the latch bolt head 108 between the extended position and retracted position. The blocking pin includes a blocking projection 127 configured to engage a slot 109 formed on the latch bolt head when the blocking pin is in the engaged position. When the blocking projection 127 is engaged with the slot 109, the interference between the blocking projection and the slot 109 inhibits rotation of the latch bolt head 108 about the pin 124. Of course, while a slot 109 is shown in the embodiment of FIG. 2, any suitable feature of the latch bolt head (e.g., projection, shelf, recess) may engage the blocking projection 127, as the present disclosure is not so limited. According to the embodiment shown in FIG. 2, the blocking pin 126 is biased toward the engaged position with a blocking pin spring 130. According to some embodiments as shown in FIG. 2, the blocking pin spring 130 biases the blocking pin 126 relative to the latch head housing, such that the blocking pin moves with the latch bolt head 108 between the extended and retracted positions.

According to some embodiments as shown in FIG. 2, the push through latch 100 includes a deadlatching plunger 132 configured to deadlatch the push through latch to inhibit opening the push through latch via a force applied externally to the latch bolt head 108. That is, the deadlatching plunger inhibits common attacks such as carding the latch bolt head 108 from moving the latch bolt head 108 from the extended position to the retracted position. As shown in FIG. 2, the deadlatching plunger includes a deadlatching pin 134 configured to selectively engage the latch housing 102. The deadlatching plunger 132 also includes a spacer 136 which controls the engagement of the deadlatching pin 134 with the latch housing 102. The deadlatching plunger moves between a free position and a deadlatching position. The free position of the deadlatching plunger corresponds to an extended position, whereas the deadlatching position corresponds to a retracted position relative to the latch housing 102. The deadlatching plunger is held in the deadlatching position when the push through latch 100 is aligned with a latch head pocket. In particular, the deadlatching plunger is configured to engage the strike plate 200 of the latch head pocket which moves the deadlatching plunger from the free position to the deadlatching position. When the deadlatching plunger is in the deadlatching position, the spacer 136 engages the deadlatching pin 134 to move the deadlatching pin radially outward (i.e., transverse to a longitudinal axis of the latch housing) to engage the latch housing 102 and the latch head housing. Accordingly, in the deadlatching position the deadlatching plunger inhibits relative movement of the latch head housing and the latch 102, such that the latch bolt head 108 may not move from the extended position to the retracted position. The spacer 136 is urged into contact with the deadlatching pin 134 by a coupling ball 140 disposed between the deadlatching plunger 132 and the blocking pin 126. The coupling ball 140 abuts the blocking pin 126 and the spacer 136, thereby applying force to the deadlatching pin 134 to secure the latch bolt head housing relative to the latch housing 102. As shown in FIG. 2, the deadlatching plunger 132 is biased toward the free position by a compression spring 138. Similar to the blocking pin 126, the compression spring 138 biases the deadlatching plunger relative to the latch bolt head housing, such that the deadlatching plunger moves with the latch bolt head 108 between the extended position and retracted position. In some embodiments, the deadlatching plunger moves in a direction parallel to a direction of movement of the latch bolt head between the extended position and retracted position.

According to some embodiments as shown in FIG. 2, the deadlatching pin 134 is configured to be disengaged from the latch bolt head housing and latch housing 102 based on movement of the blocking pin 126. As shown in FIG. 2, the blocking pin 126 includes a recess 128. The recess 128 is configured to selectively capture the coupling ball 140 disposed between the blocking pin 126 and the spacer 136 of the deadlatching plunger 132. When the blocking pin 126 is in the engaged position shown in FIG. 2, the coupling ball is not aligned with the recess 128, such that the coupling ball 140 urges the deadlatching pin 134 into engagement with the latch head housing and latch housing 102 via the spacer 136.

However, when the blocking pin 126 is moved to the disengaged position, the coupling ball 140 is received in the recess 128, thereby allowing the deadlatching pin 134 to move out of engagement with the latch bolt head housing and the latch housing 102. Accordingly, operation of the blocking pin 126 (e.g., via an actuator), may release the latch bolt head 108 and allow the latch bolt head to move to the retracted position.

Figure 3:
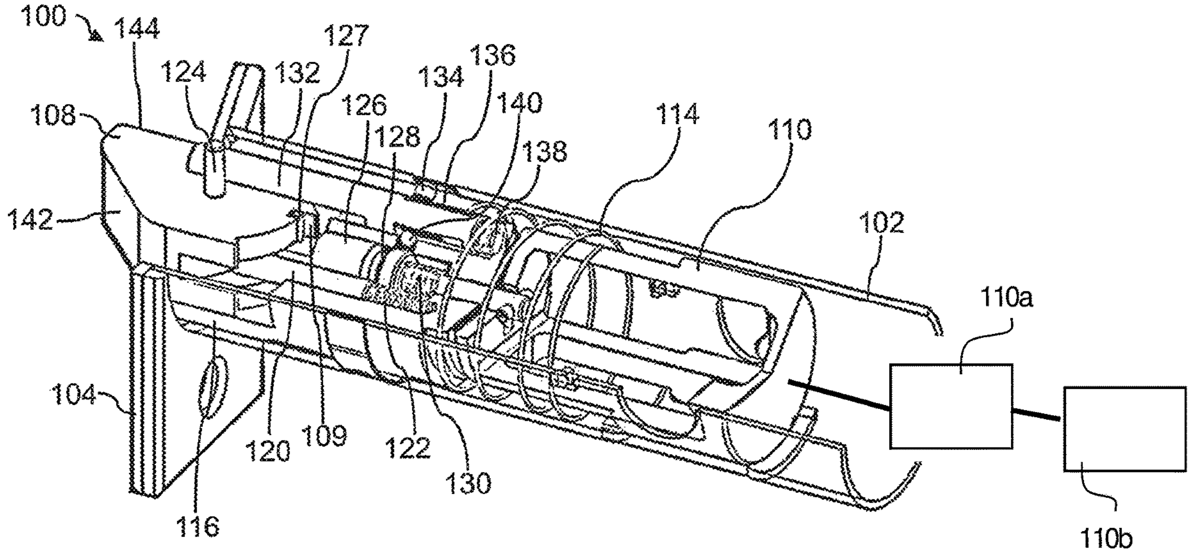
FIG. 3 is a cutaway view of the push through latch of FIG. 1 in a first state.
Figure 4:
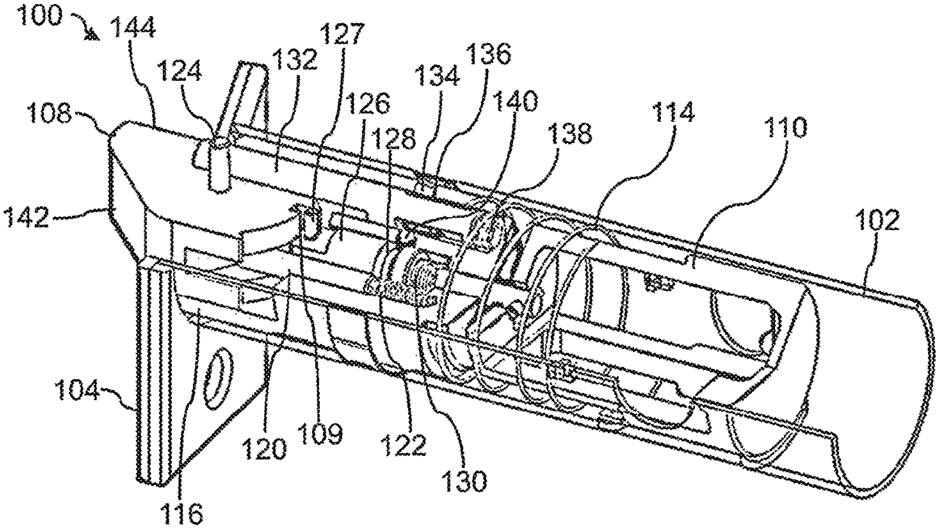
FIG. 4 is a cutaway view of the push through latch of FIG. 1 in a second state.
Figure 5:
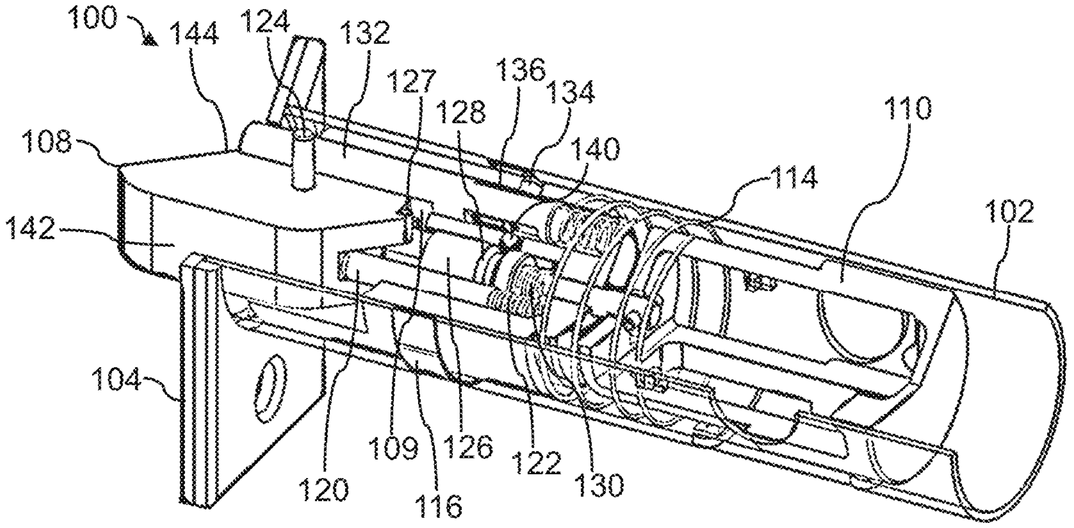
FIG. 5 is a cutaway view of the push through latch of FIG. 1 in a third state.
Figure 6:
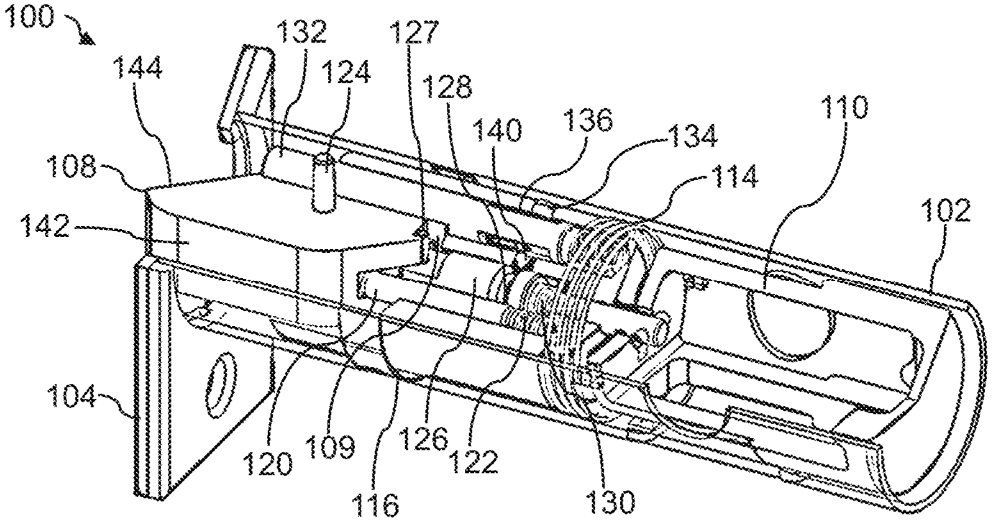
FIG. 6 is a cutaway view of the push through latch of FIG. 1 in a fourth state.
Figure 7:
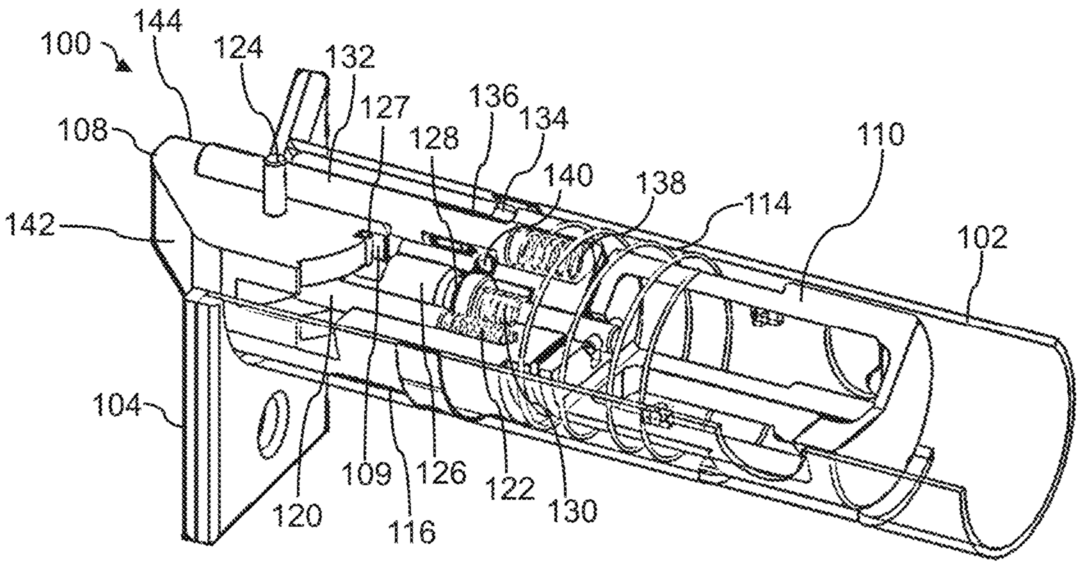
FIG. 7 is a cutaway view of the push through latch of FIG. 1 in a fifth state.
Figure 8:
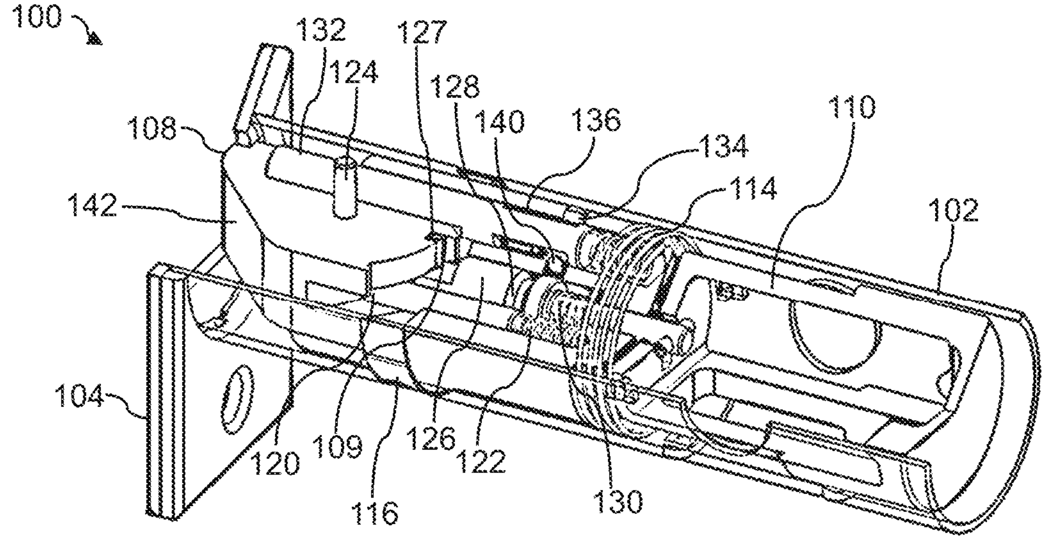
FIG. 8 is a cutaway view of the push through latch of FIG. 1 in a sixth state.

FIGS. 3-8 depict cutaway views of the push through latch 100 in various states of operation. In particular, FIG. 3 depicts the push through latch in a state associated with being engaged with a latch head pocket, and FIG. 4 depicts the push though latch in a state associated with moving the blocking pin 126 to a disengaged position. FIG. 5 depicts the push through latch in a state associated with the latch bolt head 108 being moved to the second rotational position, and FIG. 6 depicts the push through latch in a retracted state associated with pushing a door open after the latch bolt head 108 is rotated to the second rotational position. FIG. 7 depicts the push through latch in an extended state associated with the push through latch being disposed outside of a latch head pocket, and FIG. 8 depicts the push through latch in a retracted state associated with the push through being retracted as a door is closed, before the latch extends into a latch head pocket.

FIG. 3 is a cutaway view of the push through latch 100 of FIG. 1 in a first state associated with the latch bolt head 108 being engaged with a latch head pocket. As discussed previously with reference to FIG. 2, in the state of FIG. 3, the latch bolt head is in an extended position and a first rotational position. The blocking pin 126 is in the engaged position, with a blocking projection 127 being engaged with a slot 109 of the latch bolt head 108. The blocking projection 127 inhibits rotation of the latch bolt head 108 about the pin 124, such that the latch bolt head is limited to linear movement between the extended position and retracted position. However, the deadlatching plunger 132 is in a deadlatching position, and the spacer 136 and coupling ball 140 urge the deadlatching pin 134 into engagement with the latch housing 102 and the latch bolt head housing 116 to inhibit the latch bolt head from moving to the retracted position from the extended position.

According to some embodiments as shown in FIG. 3, the latch bolt head 108 includes a strike face 142 and a locking face 144 opposite the strike face 142. When the latch bolt head 108 is in the first rotational position shown in FIG. 3, the strike face 142 is inclined relative to a direction of movement of the latch bolt head 108 between the extended position and retracted position. Put another way, the strike face is inclined relative to a longitudinal axis of the latch housing 102 (e.g., a first axis). Accordingly, when the strike face 142 strikes a strike plate or a portion of a door jamb when an associated door is moved in a closing direction, a force acting on strike face 142 may urge the latch bolt head from the extended position to the retracted position to allow the latch bolt head to clear the strike plate or door jamb. In contrast, in the first rotational position the locking face 144 is substantially parallel to the direction of movement of the latch bolt head 108 between the extended position and the retracted position. Put another way, the locking face 144 is parallel to the longitudinal axis of the latch housing 102. This arrangement allows the locking face to engage a strike plate or portion of a door jamb without urging the latch bolt head toward the retracted position when the latch bolt head is disposed in a latch head pocket of the door jamb. Accordingly, the locking face 144 may inhibit an associated door from being opened when the push through latch is in the state shown in FIG. 3.

FIG. 4 is a cutaway view of the push through latch 100 of FIG. 1 in a second state associated with moving the blocking pin 126 to a disengaged position. As shown in FIG. 4, the blocking pin 126 has been moved from the engaged position shown in FIG. 3 to a disengaged position. The blocking projection 127 has cleared the slot 109 of the latch bolt head 108. Accordingly, the latch bolt head may rotate from the first rotational position to the second rotational position (see FIG. 5) about the pin 124. Movement of the blocking pin 126 alone does not rotate the latch bolt head 108 to the second rotational position, as the latch bolt head biasing plunger 120 urges the latch bolt head 108 toward the first rotational position. In the embodiment of FIG. 4, the blocking pin 126 moves between the engaged position and the disengaged position in a direction parallel to a longitudinal axis of the latch housing 102.

As shown in FIG. 4, movement of the blocking pin 126 to the disengaged position aligns the recess 128 of the blocking pin with the coupling ball 140. Accordingly, the coupling ball is received in the recess, which allows the coupling ball to disengage the spacer 136. As a result, the spacer disengages the deadlatching pin 134, thereby undeadlatching the push through latch 100 and allowing the latch bolt head 108 to be moved from the extended position shown in FIG. 4 to the retracted position (see FIG. 6).

FIG. 5 is a cutaway view of the push through latch 100 of FIG. 1 in a third state where the latch bolt head 108 is in the second rotational position. Relative to the state shown in FIG. 4, the latch bolt head 108 has been rotated about the pin 124, which is arranged perpendicular to the longitudinal axis of the latch housing 102. The latch bolt head 108 may be moved to the second rotational position by applying force to the locking face 144 (e.g., by pushing an associated door). As force is applied to the locking face 144, the latch bolt head 108 is rotated to the second rotational position shown in FIG. 5 against the force of the latch bolt head biasing plunger 120. In the state shown in FIG. 5, the locking face is inclined relative to the direction of movement of the latch bolt head 108 between the extended position and the retracted position. Put another way, the locking face is inclined relative to the longitudinal axis of the latch housing 102. Applying further/continued force to the locking face is converted into force moving the latch bolt head 108 from the extended position to the retracted position. Thus, in this manner the latch bolt head 108 may be retracted merely by moving the blocking pin 127 from the engaged position to the disengaged position and applying a force to an associated door. In the second rotational position shown in FIG. 5, the strike face 142 that was inclined relative to the direction of the latch bolt head 108 between the extended and retracted position is now parallel to that direction.

FIG. 6 is a cutaway view of the push through latch 100 of FIG. 1 in a fourth state associated with pushing an associated door open after the latch bolt head 108 is rotated to the second rotational position. As shown in FIG. 6, the latch bolt head 108 has moved into the latch housing 102 as a strike plate or other portion of a latch head pocket applied force to the locking face 144 as the associated door is pushed or pulled open. Likewise, as the latch bolt head 108 is rotatably coupled to the latch bolt head housing 116 with a pin 124, the latch bolt head housing moves into the latch housing 102 against the urging force of the spring 114. Along with the latch bolt head housing 116, the latch bolt head biasing plunger 120 and deadlatching plunger 132 are moved into the latch housing 102. Accordingly, the latch bolt head 108 may clear the associated latch head pocket to release the associated door.

FIG. 7 is a cutaway view of the push through latch 100 of FIG. 1 in a fifth state associated with the movement of the latch bolt head 108 to the extended position once the latch bolt head clears an associated door jamb. Once the latch bolt head is free and clear of any strike plate or portion of a latch bolt pocket, the various springs in the push through latch return the latch bolt head 108 to the first rotational position and the extended position. That is, the biasing plunger spring 122 acts against the latch bolt head housing 116 to urge the latch bolt head to rotate about the pin 124 back to the first rotational position. Meanwhile, the compression spring 114 disposed between the handle actuator 110 and the latch bolt head housing 116 urges the latch bolt head housing (and correspondingly the latch bolt head 108) back to the extended position. Furthermore, the blocking pin spring 130 moves the blocking pin 126 back into the engaged position, with the blocking projection 127 engaged with the slot 109. Finally, the deadlatching plunger 132 has been moved to the free position by the deadlatching plunger spring 138. In the free position, the spacer 136 is not aligned with and correspondingly not engaged with the deadlatching pin 134. Accordingly, the push through latch 100 is not deadlatched and the latch bolt head is free to move between the extended position and retracted position.

FIG. 8 is a cutaway view of the push through latch 100 of FIG. 1 in a sixth state associated with the latch bolt head 108 being retracted as a door is closed before the latch bolt head extends into an associated latch head pocket. As discussed with reference to FIG. 7, when the latch bolt head clears an associated latch head pocket the springs in the push through latch may return the latch bolt head to the first rotational position and extended position. Accordingly, the strike face 142 is returned to a state where the strike face is inclined relative to a direction of movement of the latch bolt head between the extended position and retracted position. Accordingly, when the strike face strikes a strike plate or other portion of a door jamb, the strike face may convert the force into force moving the latch bolt head from the extended position to the retracted position. As the deadlatching plunger 132 is in the free position, the deadlatching pin 134 does not interfere with movement of the latch bolt head housing 116 relative to the latch housing 102. Accordingly, the latch bolt head 108 and the latch bolt head housing 116 move into the latch housing 102 against the urging of the compression spring 114. Once the latch bolt head 108 clears the associated strike or door jamb, the spring may move the latch bolt head 108 to the extended position where the latch bolt head is received in the latch bolt pocket. Accordingly, the push through latch 100 may revert to the state shown in FIG. 3.

FIGS. 9-13 depict another embodiment of a push through latch having an alternative deadlatching arrangement. The embodiment of FIGS. 9-13 is shown schematically from a top perspective for simplicity.

Figure 9:
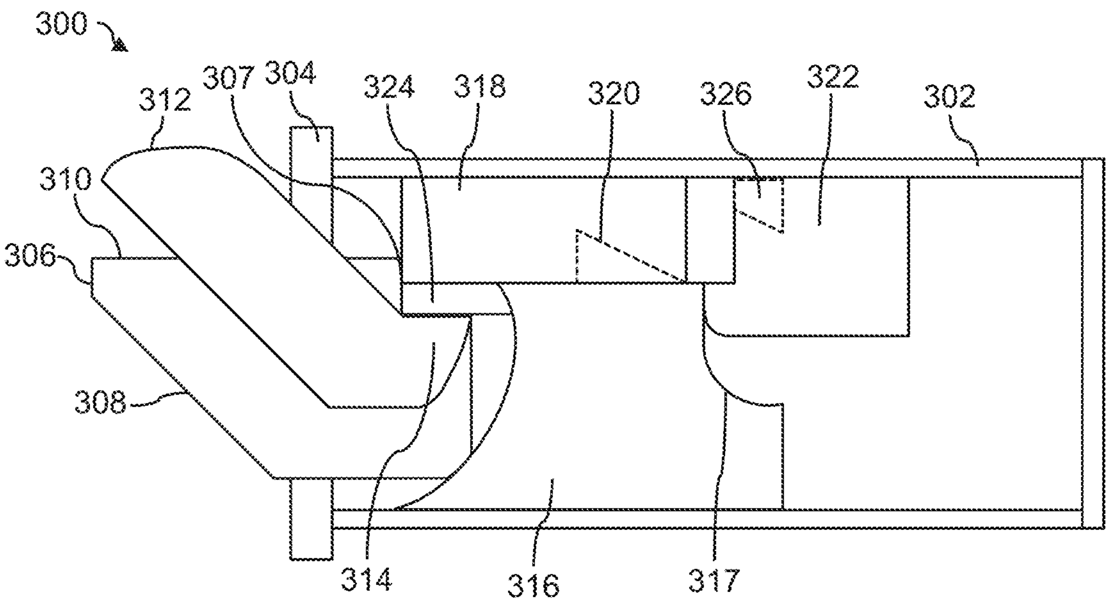
FIG. 9 is a top schematic view of another embodiment of a push through latch in a first state.

FIG. 9 is a top schematic view of another embodiment of a push through latch 300 in a first state corresponding to a state where the push through latch may not be received in a latch head pocket. As shown in FIG. 9, the push through latch includes a latch housing 302 and a door plate 304. The latch housing 302 and door plate 304 may be used to rigidly secure the push through latch inside of an associated door. As shown in FIG. 9, the push through latch includes a latch bolt head 306 having a strike face 308 and a locking face 310. The latch bolt head includes a deadlatching plunger 312 extending from the locking face 310 at an incline relative to a longitudinal axis of the latch housing 302. The deadlatching plunger 312 includes a deadlatching tail 314 which is configured to control the vertical position of a deadlatching pin 322. The deadlatching pin is configured to engage a latch bolt head coupler 316 to selectively inhibit movement of the latch bolt head 306 from an extended position to a retracted position. The push through latch also includes a blocking slider 318 configured to selectively engage the latch bolt head 306 to inhibit rotation of the latch bolt head 306 between a first rotational position and a second rotational position. In particular, the blocking slider 318 is configured to engage a shelf 307 of the latch bolt head 308 to inhibit rotation of the latch bolt head when the slider is in an engaged position.

According to the embodiment of FIG. 9, the deadlatching pin 322 is configured to move in a direction transverse to a longitudinal axis of the latch housing 302 between a deadlatching position and a free position (i.e., transverse to a direction of movement of the latch bolt head 306 between the extended position and retracted position). In FIG. 9, the deadlatching pin 322 is in the free position and is out of contact with a deadlatching shelf 317 of the latch bolt head coupler 316. The deadlatching pin 322 includes an arm 324 engaged with the tail 314 of the deadlatching plunger 312. The tail 314 maintains the deadlatching pin 322 in the free position. When the deadlatching pin 322 is in the free position the latch bolt head 306 and latch bolt head coupler 316 are free to move between the extended position and retracted position. According to the embodiment of FIG. 9, the deadlatching pin also includes an inclined surface 326 configured to engage a corresponding inclined surface 320 of the slider 318. When the slider 318 moves to the disengaged position, the inclined surface 320 of the slider is configured to engage the inclined surface 326 of the deadlatching pin to move the deadlatching pin to the free position. Thus, movement of the slider 318 from the engaged position to the disengaged position may both free the latch bolt head 306 to rotate between first and second rotational positions, and free the latch bolt coupler 316 and latch bolt head to move between the extended position and the retracted position.

Figure 10:
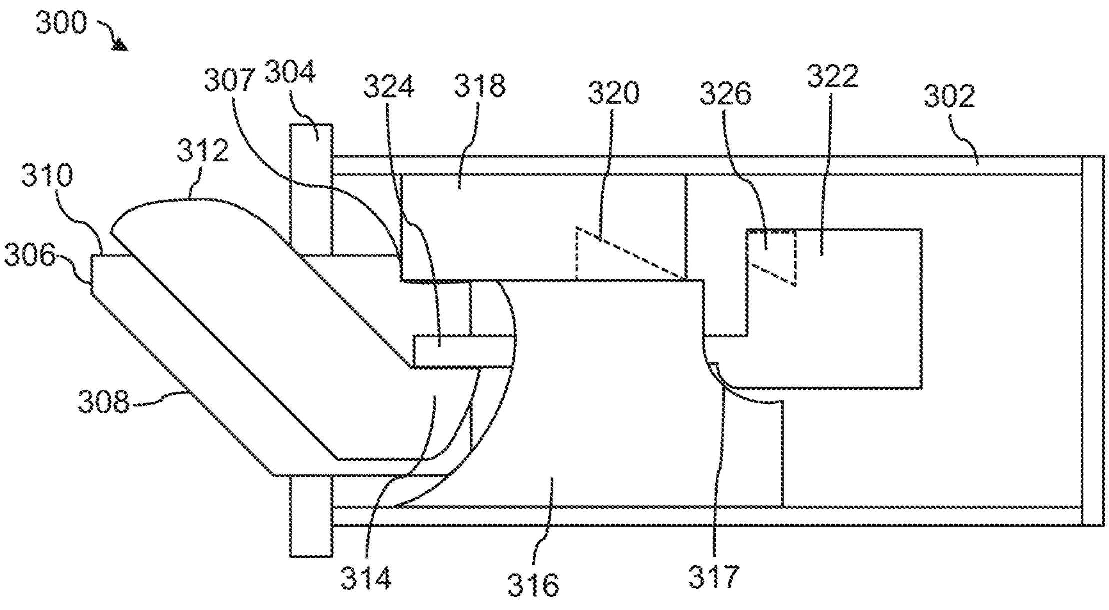
FIG. 10 is a top schematic view of the push through latch of FIG. 9 in a second state.

FIG. 10 is a top schematic view of the push through latch 300 of FIG. 9 in a second state associated with the latch bolt head 306 being disposed in an associated latch head pocket. As shown in FIG. 10, the deadlatching plunger 312 has been depressed and moved at an approximately 45 degree angle relative to the longitudinal axis of the latch housing 302 into the latch bolt head. That is, the deadlatching plunger moves in a direction inclined relative to a direction of movement of the latch bolt head between the extended position and retracted position. Correspondingly, the tail 314 of the deadlatching plunger has been moved to allow the deadlatching pin 322 to move from the free position to the deadlatching position. In the deadlatching position, the deadlatching pin engages the deadlatching shelf 317 of latch bolt head 316 coupler. Accordingly, both the latch bolt head 306 and the latch bolt head coupler 316 are inhibited from moving along the longitudinal axis of the latch housing 302 from the extended position to the retracted position. As shown in FIG. 10, the slider 318 is engaged with the shelf 307 of the latch bolt head 306 to inhibit the latch bolt head from rotating from the first rotational position to the second rotational position.

Figure 11:
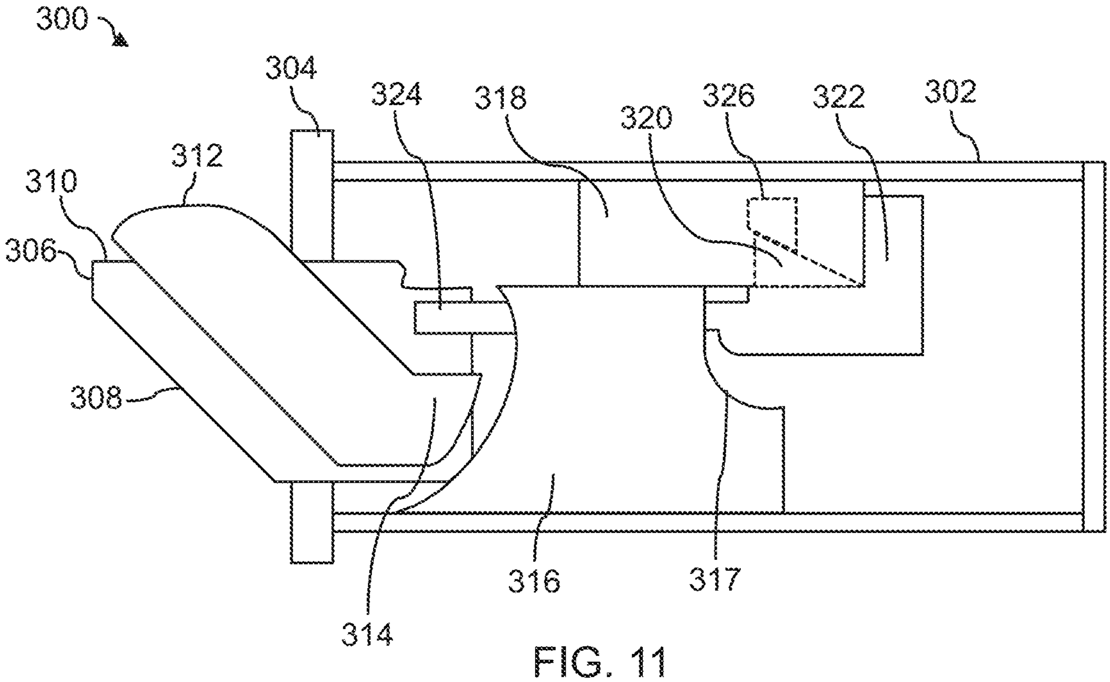
FIG. 11 is a top schematic view of the push through latch of FIG. 9 in a third state.

FIG. 11 is a top schematic view of the push through latch 300 of FIG. 9 in a third state associated with the slider 318 being in a disengaged position. Relative to the state shown in FIG. 10, the blocking slider 318 has been moved linearly parallel to a longitudinal axis of the latch housing 302 (e.g., right relative to the page). Accordingly, the slider 318 is no longer engaged with the latch bolt head 306 and the latch bolt head is free to rotate from the first rotational position to the second rotational position (see FIG. 12). The slider may be moved manually (e.g., with a button or slider accessible to a user) or electromechanically (e.g., with a solenoid, linear actuator, etc.). As shown in FIG. 11, the slider 318 also engages the deadlatching pin 322 to move the deadlatching pin from the deadlatching position to the free position. In particular, the inclined surface 320 of the slider engages the corresponding inclined surface 326 of the deadlatching pin 322 to move the deadlatching pin out of contact with the latch bolt head coupler 316. Accordingly, the latch bolt head 306 may also be moved between the extended position and the retracted position (see FIG. 13).

Figure 12:
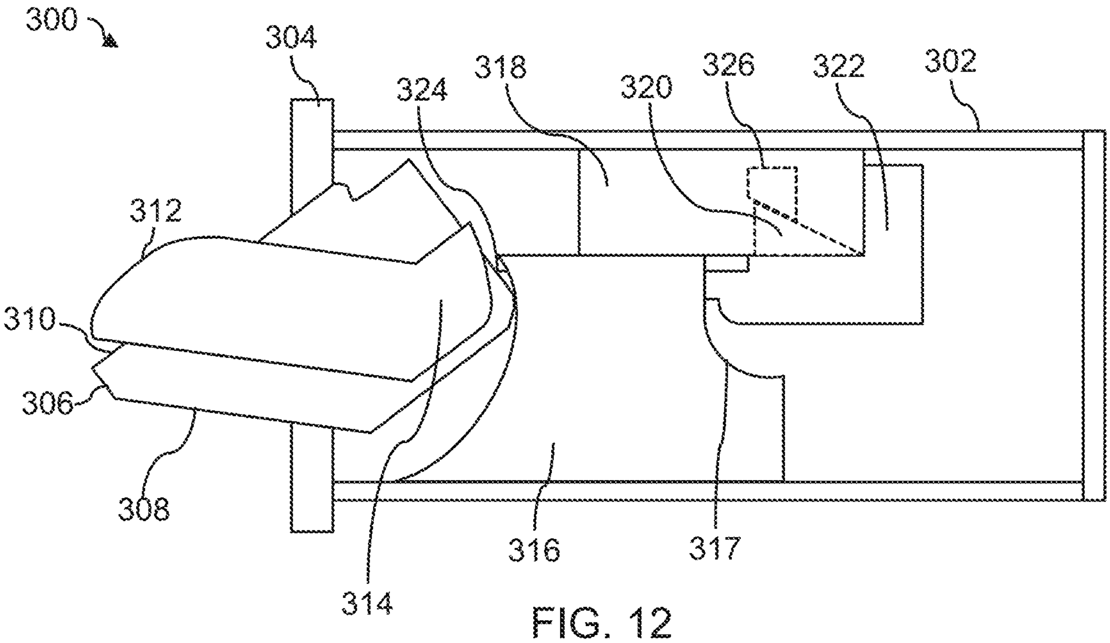
FIG. 12 is a top schematic view of the push through latch of FIG. 9 in a fourth state.

FIG. 12 is a top schematic view of the push through latch 300 of FIG. 9 in a fourth state associated with pushing or pulling an associated door open once the latch bolt head 306 is free to rotate to the second rotational position. As shown in FIG. 12, the latch bolt head has rotated counterclockwise relative to the page to a second rotational position. The rotation may be caused by the application of force to the locking face 310 and/or deadlatching plunger 312 once the latch bolt head is freed to rotate. Such force may be applied by pushing or pulling on an associated door. When the latch bolt head is in the second rotational position, the locking face 310 is no longer parallel to a direction of movement of the latch bolt head between the extended position and the retracted position. Accordingly, force applied to the locking face 310 in the state shown in FIG. 12 may move the latch bolt head 306 from the extended position to the retracted position.

Figure 13:
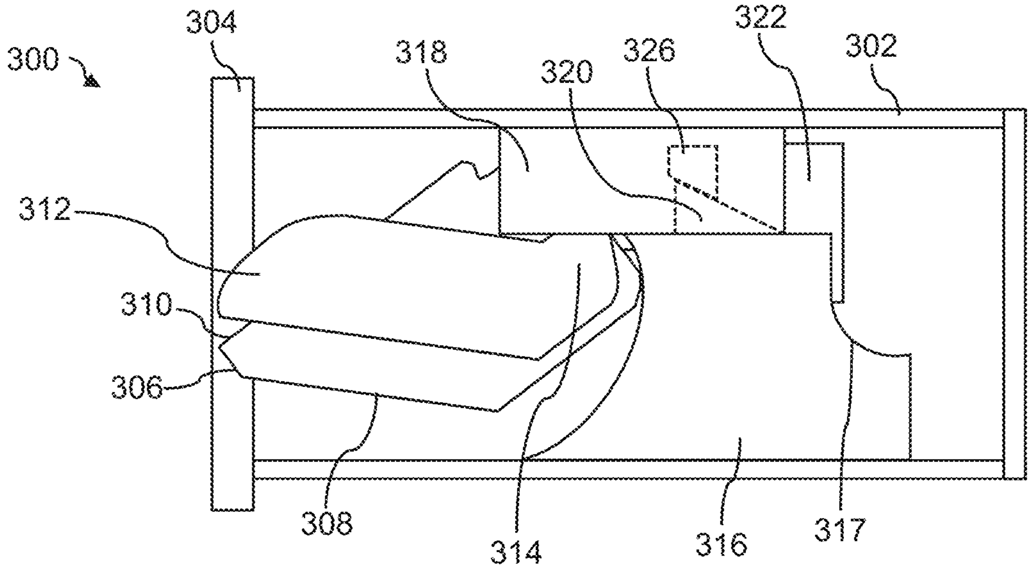
FIG. 13 is a top schematic view of the push through latch of FIG. 9 in a fifth state.

FIG. 13 is a top schematic view of the push through latch of FIG. 9 in a fifth state where the latch bolt head 306 is in the second rotational position and the retracted position. This state of FIG. 13 may be associated with opening an associated door where the latch bolt head 306 has yet to clear an associated door jamb. As shown in FIG. 13, in the retracted position the latch bolt head is retracted within the door plate 304, so that the latch bolt head does not interfere with any portion of the associated door jamb. Of course, the latch bolt head 306 may be pressed against the associated door jamb as the door is opened, as the door jamb may provide the force moving the latch bolt head 306 to the retracted position and retaining the latch bolt head in the retracted position. Along with the latch bolt head 306, the latch bolt head coupler 316 has been moved into the latch housing 302.

Figure 14:
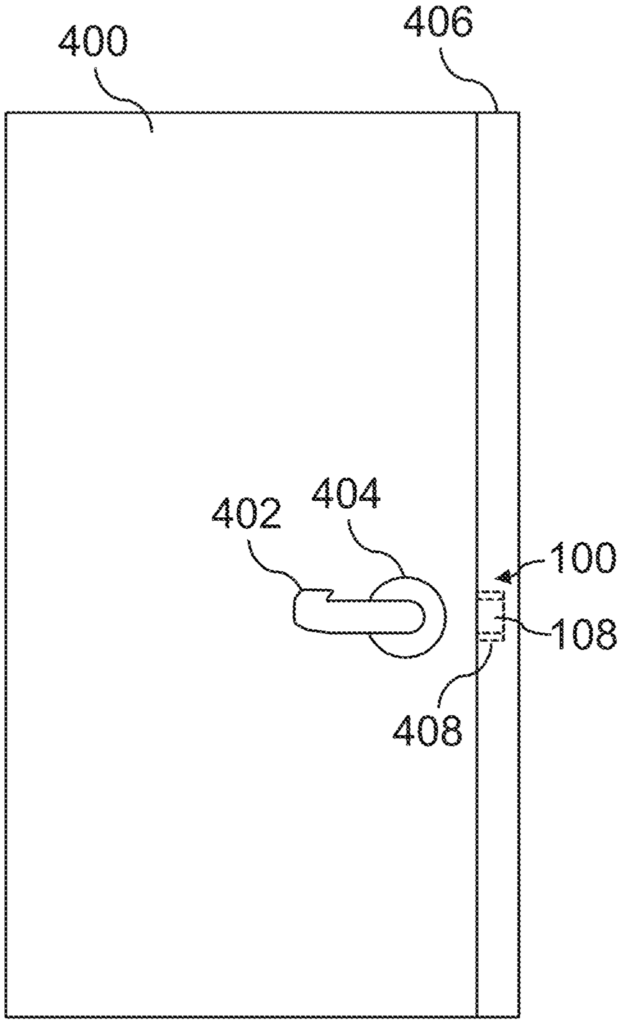
FIG. 14 is a first side view of one embodiment of a door including a push through latch of exemplary embodiments described herein.
Figure 15:
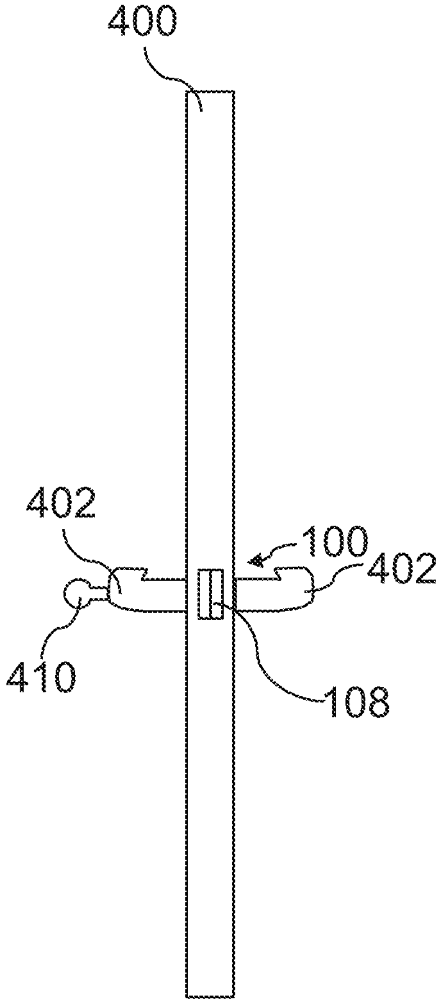
FIG. 15 is an edge view of the door of FIG. 14.

FIG. 14 is a first side view and FIG. 15 is an edge view of one embodiment of a door 400 including a push through latch of exemplary embodiments described herein. As shown in FIGS. 14-15, the door 400 includes a push through latch 100. The push through latch is integrated into the door (e.g., secured by a door plate). A latch bolt head 108 extends from the door and into a door jamb 406, and in particular a latch head pocket 408 formed in the door jamb. The door also includes an escutcheon 404 and a handle 402 that are coupled to the push through latch 100. The handle may be selectively operable to move the latch bolt head 108 from the extended position to the retracted position. In some embodiments as shown in FIG. 15, an exterior handle of the door 400 may include a key cylinder configured to receive a key 410 to selectively lock or unlock the push through latch.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A door lock comprising:

a latch bolt head having a strike face and a locking face, wherein the latch bolt head is moveable along a first axis between an extended position and a retracted position, wherein the latch bolt head is movable between a first rotational position and a second rotational position, wherein in the first rotational position, the locking face is parallel to the first axis, and wherein in the second rotational position the locking face is angled relative to the first axis; and a blocking pin configured to move between an engaged position and a disengaged position, wherein in the engaged position, the blocking pin prevents the latch bolt head from moving from the first rotational position to the second rotational position wherein the blocking pin includes a blocking projection configured to engage a recess within the latch bolt head when the blocking pin is in the engaged position and when the blocking pin is in the disengaged position, wherein the recess within the latch bolt head is at least in part defined by a location of the blocking projection relative to the latch bolt head as the latch bolt head moves between the first rotational position and the second rotational position, and wherein in the engaged position, the blocking projection is engaged with a slot in the recess on the latch bolt head.

2. The door lock of claim 1, further comprising an actuator actuable by a user to move the blocking pin from the engaged position to the disengaged position.

3. The door lock of claim 2, wherein the actuator is a push button.

4. The door lock of claim 2, wherein the actuator includes an electromechanical actuator.

5. The door lock of claim 4, wherein the electromechanical actuator is a solenoid.

6. The door lock of claim 1, further comprising a latch housing, a latch bolt head housing, and an actuator, wherein the latch bolt head and the blocking pin are operatively coupled with the latch bolt head housing, wherein the latch bolt head housing is slidably disposed in the latch housing, and wherein the actuator is operatively coupled with the latch bolt head housing to move the latch bolt head between the extended position and the retracted position.

7. The door lock of claim 6, wherein the latch housing is coupled to the actuator with a compression spring.

8. The door lock of claim 6, further comprising a deadlatching plunger configured to move between a free position and a deadlatching position, wherein in the deadlatching position, the deadlatching plunger engages the latch housing to prevent movement of the latch bolt head from the extended position to the retracted position.

9. The door lock of claim 8, wherein the deadlatching plunger engages the latch housing with a deadlatching pin.

10. The door lock of claim 9, further comprising a coupling ball disposed between the deadlatching plunger and the blocking pin, wherein the blocking pin includes a recess configured to selectively receive the coupling ball, wherein the recess is not aligned with the coupling ball when the deadlatching plunger is in the deadlatching position and the blocking pin is in the engaged position, and wherein the recess is aligned and receives the coupling ball when the deadlatching plunger is in the deadlatching position and the blocking pin is in the disengaged position.

11. The door lock of claim 10, wherein the coupling ball is configured to bias the deadlatching pin into engagement with the latch housing when the coupling ball is not disposed in the recess, and wherein the deadlatching pin is disengaged with the latch housing when the coupling ball is received in the recess.

12. The door lock of claim 8, wherein the deadlatching plunger moves in a direction parallel to the first axis between the free position and deadlatching position.

13. The door lock of claim 1, further comprising a deadlatching plunger configured to move between a free position and a deadlatching position, wherein in the deadlatching position, the deadlatching plunger operatively engages the latch bolt head to prevent movement of the latch bolt head from the extended position to the retracted position.

14. The door lock of claim 13, wherein the deadlatching plunger moves in a direction parallel to the first axis between the free position and deadlatching position.

15. The door lock of claim 1, wherein the latch bolt head rotates about a second axis between the first rotational position and second rotational position, wherein the second axis is perpendicular to the first axis.

16. The door lock of claim 1, wherein the blocking pin moves in a direction parallel to the first axis between the engaged position and the disengaged position.

17. The door lock of claim 1, wherein in the second rotational position, the locking face is configured to strike a latch head pocket and move the latch bolt head from the extended position to the retracted position.

18. A door assembly including the door lock of claim 1, wherein the door assembly includes a door housing the door lock, and a door jamb including a latch head pocket, wherein in the first rotational position, the strike face is configured to strike the latch head pocket and move the latch bolt head from the extended position to the retracted position, and wherein in the second rotational position, the locking face is configured to strike the latch head pocket and move the latch bolt head from the extended position to the retracted position.

19. A door lock comprising:

a latch bolt head having a strike face and a locking face, wherein the latch bolt head is moveable along a first axis between an extended position and a retracted position, wherein the latch bolt head is movable between a first rotational position and a second rotational position, wherein in the first rotational position, the locking face is parallel to the first axis, and wherein in the second rotational position the locking face is angled relative to the first axis;

a blocking pin configured to move between an engaged position and a disengaged position, wherein in the engaged position, the blocking pin prevents the latch bolt head from moving from the first rotational position to the second rotational position;

a latch housing;

a latch bolt head housing, wherein the latch bolt head housing is slidably disposed in the latch housing, wherein the latch bolt head and the blocking pin are operatively coupled with the latch bolt head housing;

an actuator, wherein the actuator is operatively coupled with the latch bolt head housing to move the latch bolt head between the extended position and the retracted position;

a deadlatching pin within the latch housing;

a deadlatching plunger, wherein the deadlatching plunger is configured to move between a free position and a deadlatching position, wherein in the deadlatching position, the deadlatching plunger engages the latch housing via engagement with the deadlatching pin to prevent movement of the latch bolt head from the extended position to the retracted position; and a coupling ball disposed between the deadlatching plunger and the blocking pin, wherein the blocking pin includes a recess configured to selectively receive the coupling ball, wherein the recess is not aligned with the coupling ball when the deadlatching plunger is in the deadlatching position and the blocking pin is in the engaged position, and wherein the recess is aligned and receives the coupling ball when the deadlatching plunger is in the deadlatching position and the blocking pin is in the disengaged position.

* * * * *